United States Patent
Ono et al.

(10) Patent No.: US 12,313,817 B2
(45) Date of Patent: May 27, 2025

(54) OPTICAL LAMINATE, ARTICLE, AND IMAGE DISPLAY APPARATUS

(71) Applicant: DEXERIALS CORPORATION, Tochigi (JP)

(72) Inventors: Tetsuya Ono, Shimotsuke (JP); Daichi Nakanishi, Shimotsuke (JP); Yuko Kibushi, Shimotsuke (JP)

(73) Assignee: DEXERIALS CORPORATION, Tochigi (JP)

( * ) Notice: Subject to any disclaimer, the term of this patent is extended or adjusted under 35 U.S.C. 154(b) by 539 days.

(21) Appl. No.: 17/655,926

(22) Filed: Mar. 22, 2022

(65) Prior Publication Data

US 2022/0317339 A1 Oct. 6, 2022

(30) Foreign Application Priority Data

Mar. 25, 2021 (JP) .................................. 2021-051937

(51) Int. Cl.
*G02B 1/14* (2015.01)
*G02B 1/18* (2015.01)

(52) U.S. Cl.
CPC *G02B 1/14* (2015.01); *G02B 1/18* (2015.01)

(58) Field of Classification Search
CPC ......... G02B 1/14; G02B 1/18; G02B 27/0006
USPC ........................................................ 359/507
See application file for complete search history.

(56) References Cited

U.S. PATENT DOCUMENTS

| | | | | |
|---|---|---|---|---|
| 2013/0279155 | A1* | 10/2013 | Kuroda | G09F 13/04 362/97.4 |
| 2016/0091632 | A1* | 3/2016 | Shimatsu | G02B 1/14 359/581 |
| 2017/0131439 | A1* | 5/2017 | Kobori | C08J 7/18 |
| 2018/0009959 | A1* | 1/2018 | Nakashima | B32B 27/40 |
| 2018/0372920 | A1* | 12/2018 | Bellman | H05K 5/03 |
| 2019/0227195 | A1 | 7/2019 | Horio et al. | |
| 2019/0310394 | A1 | 10/2019 | Miyamoto et al. | |
| 2020/0282710 | A1* | 9/2020 | Washio | C08K 3/36 |
| 2021/0364673 | A1* | 11/2021 | Eguchi | G02B 5/3033 |
| 2021/0405272 | A1* | 12/2021 | Isojima | G09F 9/301 |
| 2022/0342135 | A1* | 10/2022 | Tanaka | G02B 5/3083 |

FOREIGN PATENT DOCUMENTS

| | | |
|---|---|---|
| CN | 103154786 A | 6/2013 |
| CN | 104237978 A | 12/2014 |
| CN | 111183374 | 5/2020 |
| CN | 111183375 A | 5/2020 |

(Continued)

OTHER PUBLICATIONS

"European Application Serial No. 22163799.4, European Search Report dated Jul. 27, 2022", (Jul. 27, 2022), 7 pgs.

(Continued)

*Primary Examiner* — Ricky D Shafer
(74) *Attorney, Agent, or Firm* — Schwegman Lundberg & Woessner. P.A.

(57) ABSTRACT

This optical laminate includes a transparent base material, a hard coat layer, an optical function layer, and an anti-fouling layer, which are laminated in that order, in which the hard coat layer contains a filler, the hard coat layer has a thickness of 3 μm or more and 25 μm or less, and a 10-point average roughness Rz of a surface of the optical laminate is 19 nm or more and 100 nm or less.

10 Claims, 2 Drawing Sheets

(56) References Cited

FOREIGN PATENT DOCUMENTS

| | | |
|---|---|---|
| JP | H09260361 A | 10/1997 |
| JP | 2002120311 | 4/2002 |
| JP | 2005146272 | 6/2005 |
| JP | 2006145587 | 6/2006 |
| JP | 2007183402 | 7/2007 |
| JP | 2007194109 | 8/2007 |
| JP | 2007301970 | 11/2007 |
| JP | 2008268328 | 11/2008 |
| JP | 2012238849 A | 12/2012 |
| JP | 2013258391 A | 12/2013 |
| JP | 2014032317 A | 2/2014 |
| JP | 2014106240 A | 6/2014 |
| JP | 2015036867 A | 2/2015 |
| JP | 2015177134 A | 10/2015 |
| JP | 2016001318 A | 1/2016 |
| JP | 2016157068 | 9/2016 |
| JP | 2017054146 | 3/2017 |
| JP | 2017161893 | 9/2017 |
| JP | 2019136880 A | 8/2019 |
| JP | 2019196488 A | 11/2019 |
| JP | 2020008877 A | 1/2020 |
| KR | 20170031640 | 3/2017 |
| WO | 2015125498 | 8/2015 |
| WO | 2017022638 | 2/2017 |
| WO | 2019139150 | 7/2019 |
| WO | WO-2021106788 A1 | 6/2021 |

OTHER PUBLICATIONS

"an example of WinROOF operation—elementary measurement using binarization", [Online]. Retrieved from the Internet: <URL: https://www.mitani-visual.jp/mivlog/software/bin03858.php>, (accessed Mar. 3, 2023), 14 pgs.

"Image analysis/image measurement software "particle analysis"", [Online]. Retrieved from the Internet: <URL: https://www.nstec.nipponsteel.com/technology/software/software01/software0103/,>, (accessed Mar. 3, 2023), 10 pgs.

"Japanese Application Serial No. 2021-051937, Office Action dated Nov. 16, 2021", w/ English Translation, (Nov. 16, 2021), 6 pgs.

"Korean Application Serial No. 10-2022-0015562 Office Action mailed on Jul. 8, 2022", w English Translation, 10 pgs.

"Chinese Application Serial No. 202210271682.4, Office Action dated Dec. 2, 2022", w English Translation, (Dec. 2, 2022), 17 pgs.

"Korean Application Serial No. 10-2020-7025215, Office Action dated Jul. 8, 2022", w/ Machine Translation, 15 pgs.

"Taiwanese Application Serial No. 111103150, Office Action dated Aug. 2, 2022", w/ Machine Translation, 5 pgs.

"Korean Application Serial No. 10-2022-0015562 Office Action mailed on Sep. 6, 2022", 10 pgs.

"Korean Application Serial No. 10-2022-0015562 Office Action mailed on Nov. 1, 2022", 13 pgs.

"Japanese Application No. 2022-037350, Office Action dated Jan. 28, 2025", w English Translation, (Jan. 28, 2025), 11 pgs.

\* cited by examiner

OPTICAL LAMINATE, ARTICLE, AND IMAGE DISPLAY APPARATUS

CLAIM FOR PRIORITY

This application claims priority to Japanese Patent Application No. 2021-051937, filed on Mar. 25, 2021, which is incorporated herein by reference in its entirety.

TECHNICAL FIELD

The present invention relates to an optical laminate, an article, and an image display apparatus.

BACKGROUND ART

For example, anti-reflection optical laminates may be provided on the surfaces of flat panel displays (FPDs), touch panels, solar cells, and the like. In recent years, with the increase in the market for smartphones, touch panels for various operation devices, and the like, there is a demand to improve the scratch resistance of anti-reflection optical laminates.

For example, Patent Document 1 describes controlling scratch resistance by specifying the coefficient of kinetic friction of an anti-reflection layer. In addition, for example, Patent Document 2 describes controlling scratch resistance by specifying the surface roughness and silica fine particle diameter of a hard coat layer. In addition, for example, Patent Document 3 describes controlling mechanical characteristics by specifying the average particle diameter of low refractive index nanoparticles and the solid content ratio of inorganic particles in a low refractive index layer.

PRIOR ART LITERATURE

Patent Document

[Patent Document 1] Japanese Unexamined Patent Application, First Publication No. 2020-008877
[Patent Document 2] Japanese Unexamined Patent Application, First Publication No. 2019-136880
[Patent Document 3] Japanese Unexamined Patent Application, First Publication No. 2014-106240

SUMMARY OF INVENTION

Problems to be Solved by the Invention

There is a demand for further improvement in the scratch resistance of optical laminates and a demand for the development of new configurations to increase the scratch resistance.

The present invention has been developed in light of the above circumstances, and has an object of providing an optical laminate, an article, and an image display apparatus with excellent scratch resistance.

Means for Solving the Problems

In order to achieve the above objects, this invention proposes the following aspects.

(1) An optical laminate according to a first aspect includes a transparent base material, a hard coat layer, an optical function layer, and an anti-fouling layer, which are laminated in that order, in which the hard coat layer contains a filler, the hard coat layer has a thickness of 3 μm or more and 25 μm or less, and a 10-point average roughness Rz of a surface of the optical laminate is 19 nm or more and 100 nm or less.

(2) The optical laminate according to the aspect described above, in which an apparent average particle diameter of an aggregate of the filler, which is obtained by measuring the surface of the optical laminate with an atomic force microscope, may be 150 nm or more and 2200 nm or less.

(3) The optical laminate according to the aspect described above, in which an apparent average particle diameter of an aggregate of the filler, which is obtained by measuring a surface of the hard coat layer with an atomic force microscope, may be 110 nm or more and 1600 nm or less.

(4) The optical laminate according to the aspect described above, in which the optical function layer may include at least a low refractive index layer.

(5) The optical laminate according to the aspect described above, in which a low refractive index layer and a high refractive index layer may be alternately laminated in the optical function layer.

(6) The optical laminate according to the aspect described above, in which a value of a water contact angle after 2000 cycles of a steel wool sliding test may be 84% or more of the value of a water contact angle before the steel wool sliding test.

(7) The optical laminate according to the aspect described above, in which the anti-fouling layer may include a fluorine-based compound.

(8) An article according to a second aspect includes the optical laminate according to the aspect described above.

(9) An image display apparatus according to a third aspect includes a screen, and the optical laminate according to the aspect described above, which is formed on a surface of the screen.

Effects of the Invention

The optical laminate, article, and image display apparatus according to the aspect described above have excellent scratch resistance.

DETAILED DESCRIPTION OF THE INVENTION

Figure 1:
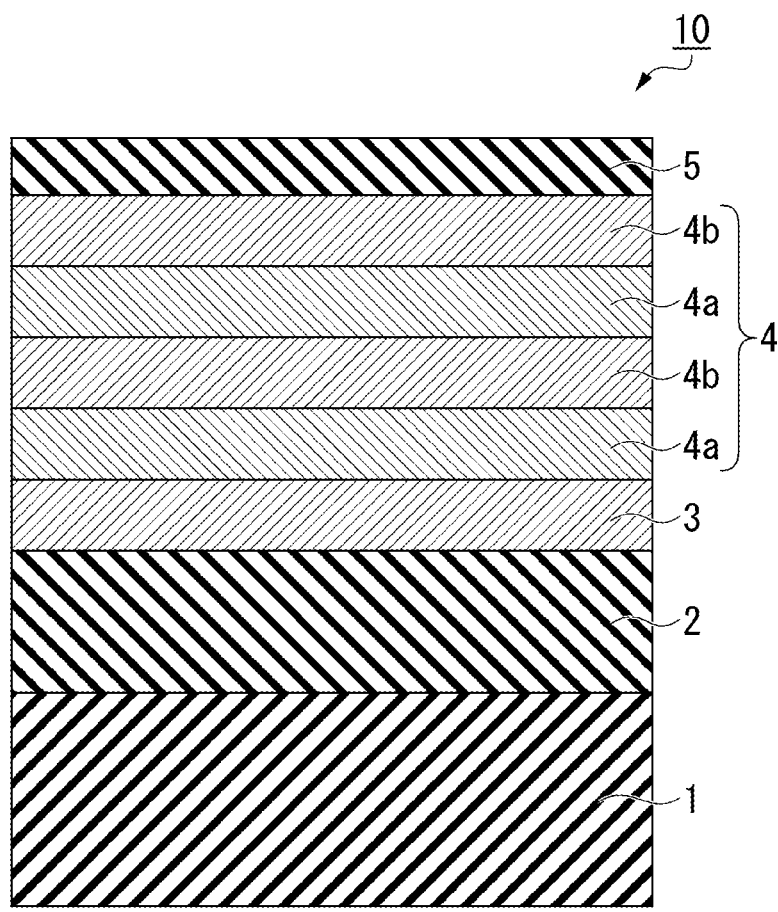
FIG. 1 is a cross-sectional view of an example of an optical laminate according to the first embodiment.

A detailed description will be given below of the present embodiment with appropriate reference to the drawings. In the drawings used in the following description, the characteristic parts may be shown in an enlarged manner for convenience in order to make the characteristics easier to understand and the dimensional ratios and the like of each constituent component may differ from in practice. The materials, dimensions, and the like illustrated in the following description are examples and the present invention is not limited thereto, but is able to be implemented with appropriate changes within a range in which the effects of the present invention are achieved.

FIG. 1 is a cross-sectional view of an example of an optical laminate 10 according to the first embodiment. In the optical laminate 10, a transparent base material 1, a hard coat layer 2, an adhesion layer 3, an optical function layer 4, and an anti-fouling layer 5 are laminated in that order.

The transparent base material 1 is formed of a transparent material able to transmit light in the visible light range. For example, the transparent base material 1 is a plastic film. The constituent material of the plastic film is, for example, a polyester-based resin, an acetate-based resin, a polyethersulfone-based resin, a polycarbonate-based resin, a polyamide-based resin, a polyimide-based resin, a polyolefin-based resin, a (meth)acrylic-based resin, a polyvinyl chloride-based resin, a polyvinylidene chloride-based resin, a polystyrene-based resin, a polyvinyl alcohol-based resin, a polyarylate-based resin, or a polyphenylene sulfide-based resin. The transparent base material 1 may formed of an inorganic base material, which may be a glass film.

The constituent material of the transparent base material 1 is preferably a polyester-based resin, an acetate-based resin, a polycarbonate-based resin, or a polyolefin-based resin. For example, the transparent base material 1 is preferably a triacetyl cellulose (TAC) base material. In a case where the plastic film is a TAC base material, when the hard coat layer 2 is formed on one surface thereof, a permeation layer is formed by the permeation of some of the components forming the hard coat layer 2. As a result, the adhesion between the transparent base material 1 and the hard coat layer 2 becomes good and it is possible to suppress the generation of interference fringes caused by the difference in refractive index between each of the layers.

The term "transparent material" in the present invention refers to a material having a light transmittance of 80% or more in the use wavelength range in a range in which the effect of the present invention is not impaired. In addition, "(meth)acrylic" in the present embodiment means methacrylic and acrylic.

The transparent base material 1 may include a reinforcing material as long as the optical characteristics are not significantly impaired. The reinforcing materials are, for example, cellulose nanofibers, nanosilica, and the like.

The transparent base material 1 may be a film to which optical functions and/or physical functions are imparted. Films having optical and/or physical functions are, for example, polarizing plates, phase difference compensation films, heat-ray blocking films, transparent conductive films, brightness improving films, barrier improving films, and the like.

The thickness of the transparent base material 1 is not particularly limited and is, for example, 25 μm or more and preferably 40 μm or more. When the thickness of the transparent base material 1 is 25 μm or more, the rigidity of the base material itself is secured and wrinkles are less easily generated even when stress is applied to the optical laminate 10. In addition, when the thickness of the transparent base material 1 is 25 μm or more, even when the hard coat layer 2 is continuously formed over the transparent base material 1, wrinkles are less easily generated and there is less concern about the manufacturing. When the thickness of the transparent base material 1 is 40 μm or more, wrinkles are even less easily generated.

In a case where the optical laminate 10 is wound into a roll form and unwound during manufacturing, the thickness of the transparent base material 1 is preferably 1000 μm or less and more preferably 600 μm or less. When the thickness of the transparent base material 1 is 1000 μm or less, the optical laminate 10 during manufacturing and the optical laminate 10 after manufacturing are easily wound up into a roll form and the manufacturing efficiency of the optical laminate 10 is increased. In addition, when the thickness of the transparent base material 1 is 1000 μm or less, it becomes possible to make the optical laminate 10 thinner and reduce the weight thereof. When the thickness of the transparent base material 1 is 600 μm or less, it is possible to manufacture the optical laminate 10 more efficiently and further thinning and weight reduction are possible, which is preferable.

The transparent base material 1 may be subjected to etching treatments and/or undercoating treatments such as sputtering, corona discharge, ultraviolet irradiation, electron beam irradiation, chemical conversion, and oxidation, on the surface in advance. By applying the above treatments in advance, the adhesion of the hard coat layer 2 formed over the transparent base material 1 is improved. Before forming the hard coat layer 2 over the transparent base material 1, the surface of the transparent base material 1 may be dusted and cleaned by performing solvent cleaning, ultrasonic cleaning, or the like on the surface of the transparent base material 1, as necessary.

The hard coat layer 2 includes a binder resin and a filler. In addition, the hard coat layer 2 may include an aggregating agent.

The binder resin is preferably transparent and is, for example, an ionizing radiation-curable resin, which is a resin cured by ultraviolet light or electron beams, a thermoplastic resin, a thermosetting resin, or the like.

Examples of ionizing radiation-curable resins which are binder resins are ethyl(meth)acrylate, ethylhexyl(meth)acrylate, styrene, methylstyrene, N-vinylpyrrolidone, and the like. In addition, the ionizing radiation-curable resin may also be a compound having two or more unsaturated bonds. Ionizing radiation-curable resins having two or more unsaturated bonds are, for example, polyfunctional compounds such as trimethylolpropane tri(meth)acrylate, tripropylene glycol di(meth)acrylate, diethylene glycol di(meth)acrylate, dipropylene glycol di(meth)acrylate, pentaerythritol tri(meth)acrylate, pentaerythritol tetra(meth)acrylate, dipentaerythritol hexa(meth)acrylate, 1,6-hexanediol di(meth)acrylate, neopentyl glycol di(meth)acrylate, trimethylolpropane tri(meth)acrylate, ditrimethylolpropane tetra(meth)acrylate, dipentaerythritol penta(meth)acrylate, tripentaerythritol octa(meth)acrylate, tetrapentaerythritol deca(meth)acrylate, isocyanuric acid tri(meth)acrylate, isocyanuric acid di(meth)acrylate, polyester tri(meth)acrylate, polyester di(meth)acrylate, bisphenol di(meth)acrylate, diglycerin tetra(meth)acrylate, adamantyl di(meth)acrylate, isobolonyl di(meth)acrylate, dicyclopentane di(meth)acrylate, tricyclodecandi(meth)acrylate, ditrimethylolpropane tetra(meth)acrylate, and the like. Among the above, pentaerythritol triacrylate (PETA), dipentaerythritol hexaacrylate (DPHA), and pentaerythritol tetraacrylate (PETTA) are suitably used as binder resins. Here, "(meth)acrylate" refers to methacrylate and acrylate. In addition, as ionizing radiation-curable resins, the compounds described above may be modified with propylene oxide (PO), ethylene oxide (EO), caprolactone (CL), and the like. For ionizing radiation-curable resins, acrylic-based UV curable resin compositions are preferable.

In addition, examples of thermoplastic resins which are binder resins are styrene-based resins, (meth)acrylic-based resins, vinyl acetate-based resins, vinyl ether-based resins, halogen-containing resins, alicyclic olefin-based resins, polycarbonate-based resins, polyester-based resins, polyamide-based resins, cellulose derivatives, silicone-based resins, rubbers or elastomers, and the like. The thermoplastic resins described above are non-crystalline and soluble in organic solvents (in particular, common solvents able to dissolve a plurality of polymers and curable compounds). In particular, from the viewpoint of transparency and weather resistance, the binder resin is preferably a styrene-based resin, a (meth)acrylic-based resin, an alicyclic olefin-based resin, a polyester-based resin, a cellulose derivative (cellulose esters and the like), or the like.

The thermosetting resin, which is the binder resin, may be, for example, a phenolic resin, a urea resin, a diallyl phthalate resin, a melamine resin, a guanamine resin, an unsaturated polyester resin, a polyurethane resin, an epoxy resin, an aminoalkyd resin, a melamine-urea co-condensation resin, a silicon resin, a polysiloxane resin (including so-called silsesquioxanes, such as cage-type and ladder-type resins, and the like), or the like.

The hard coat layer 2 may include organic resins and inorganic materials and may be an organic-inorganic hybrid material. One example is a layer formed by the sol-gel method. Examples of inorganic materials include silica, alumina, zirconia, and titania. Examples of organic materials include acrylic resin.

The filler may be formed of organic matter, of inorganic matter, or of organic matter and inorganic matter. It is possible to select the various fillers included in the hard coat layer 2 according to the application of the optical laminate 10 from the viewpoint of anti-glare characteristics, adhesion with the optical function layer 4 described below, anti-blocking characteristics, and the like. Specifically, as a filler, for example, it is possible to use known materials such as silica (Si oxide) particles, alumina (aluminum oxide) particles, and organic fine particles. In order to impart toughness to the hard coat layer 2, various reinforcing materials may be added as fillers in a range in which the optical characteristics are not impaired. The reinforcing material is, for example, cellulose nanofibers.

In a case where the filler is silica particles and/or alumina particles, the average particle diameter of the filler is, for example, 800 nm or less, preferably 100 nm or less, and more preferably 40 nm or more and 70 nm or less.

In a case where the filler is organic fine particles, the average particle diameter of the organic fine particles is, for example, 10 μm or less, preferably 5 μm or less, and more preferably 3 μm or less. There are no particular limitations on the lower limit value of the average particle diameter of the filler, in the case where the filler is the organic fine particles and/or alumina particles, the average particle diameter of the filler is preferably 100 nm or more.

The filler is dispersed in the hard coat layer 2 while a part thereof is aggregated. The aggregates in which the filler is aggregated become secondary particles. For example, when the resin portion in the hard coat layer 2 is the sea and the filler aggregates are islands, the resin portion and filler in the hard coat layer 2 form a sea-island structure. The aggregates of the filler form irregularities on the surface of the hard coat layer 2.

When the surface of the hard coat layer 2 is measured by an atomic force microscope (AFM), it is possible to confirm the aggregates of the filler as irregularities. It is possible to measure the surface shape of the hard coat layer 2 using, for example, an atomic force microscope (AFM 5000) manufactured by Hitachi High-Tech Science Corporation. The apparent average particle diameter of the aggregates of the filler, which is obtained by measuring the surface of the hard coat layer 2 with an atomic force microscope, is, for example, 110 nm or more and 1600 nm or less, preferably 230 nm or more and 1600 nm or less, and more preferably 300 nm or more and 1600 nm or less. The larger the apparent average particle diameter, the larger the surface irregularities, and the more it is possible to suppress sliding damage in the concave areas. As a result, even when the number of sliding movements is increased, the anti-fouling characteristic is easily maintained and scratches are less likely to occur.

The apparent average particle diameter of the aggregates of the filler is determined using an AFM according to Otsu's automatic threshold setting method (for example, IEICE Transactions D63(4) pages 349 to 356, 1980-04). Otsu's automatic threshold setting method is a classification method proposed by Otsu et al. which classifies a population into two classes by setting a threshold value that minimizes the within-class variance and maximizes the between-class variance. The threshold value obtained by this method is equivalent to the threshold value that minimizes the mean squared error of the binary image obtained as the original shaded image.

The AFM displays the difference in distance between the prove of the AFM and the surface of the hard coat layer 2 as a shaded image. By classifying this shaded image according to Otsu's automatic threshold setting method, the concave portions and convex portions of the surface of the hard coat layer 2 are classified. The average particle diameter of the classified convex portions becomes the apparent average particle diameter of the filler aggregates. When determining the apparent average particle diameter of the filler aggregates, 10 μm×10 μm ranges are measured by the AFM at any five points on the hard coat layer 2 and the average particle diameter determined at each of the five points is further averaged.

It is possible to control the degree of aggregation of the filler through the agitation conditions when mixing the filler and the binder resin, the filler surface treatment, the addition of the aggregating agent and the addition amount thereof, and the like. The aggregating agent is, for example, a substance with poor compatibility with the binder resin or a polar substance having high polarity. For example, compounds having oxygen or nitrogen in the cyclic structure thereof function as aggregating agents. It is possible to use other known aggregating agents.

The 10-point average roughness Rz of the surface of the hard coat layer 2 is, for example, 21 nm or more and 110 nm or less and preferably 50 nm or more and 110 nm or less. The arithmetic average roughness Ra of the surface of the hard coat layer 2 is, for example, 1.7 nm or more and 12 nm or less.

The 10-point average roughness Rz of the surface of the hard coat layer 2 is a value according to JIS B0601, and the 10-point average roughness Rz of the surface of the hard coat layer 2 can be calculated from an image analysis of an image obtained by observing the surface of the hard coat layer 2 using the AFM.

The arithmetic average roughness Ra of the surface of the hard coat layer 2 is a value according to JIS B0601, and the arithmetic average roughness Ra of the surface of the hard coat layer 2 can be calculated from an image analysis of an image obtained by observing the surface of the hard coat layer 2 using the AFM.

In the following, the 10-point average roughness Rz or the arithmetic average roughness Ra of each layers (or the optical laminate) is measured in the same way.

The filler may be partially exposed on the surface of the adhesion layer 3 side of the hard coat layer 2. In such a case, the binder resin of the hard coat layer 2 and the adhesion layer 3 are strongly joined. For this reason, the adhesion of the hard coat layer 2 and the adhesion layer 3 is improved, the hardness of the hard coat layer 2 is increased, and the scratch resistance of the optical laminate 10 becomes good.

The thickness of the hard coat layer 2 is 3 μm or more and 25 μm or less. When the thickness of the hard coat layer 2 is 3 μm or more, it is possible to suppress reaction inhibition by oxygen in the curing reaction of the binder resin. In addition, the thickness of the hard coat layer 2 being in this range makes it possible to set the irregularities of the surface of the hard coat layer 2 in a predetermined range.

The thickness of the hard coat layer 2 can be measured by the following method. That is, the optical laminate 10 is cut along the laminated direction of the optical laminate 10 to obtain the cross section of the optical laminate 10 exposing the laminated structure. Then, the cross section of the optical laminate 10 is observed by using the scanning electron microscope (SEM) to measure the thickness of the hard coat layer 2. In the following, the thickness of each layers is measured in the same way.

The hard coat layer 2 may be a single layer or a plurality of laminated layers. In addition, the hard coat layer 2 may be further imparted with known functions such as, for example, ultraviolet absorption performance, antistatic performance, a refractive index adjustment function, and a hardness adjustment function. In addition, the functions imparted to the hard coat layer 2 may be imparted in a single hard coat layer or may be imparted by being divided into a plurality of layers.

The adhesion layer 3 is a layer for improving adhesion between the hard coat layer 2 and the optical function layer 4. In a case where the hard coat layer 2 is an inorganic material, the adhesion layer 3 may be left out.

The adhesion layer 3 is, for example, a metal oxide in an oxygen-deficient state or a metal. The metal oxide in an oxygen-deficient state refers to a metal oxide in a state in which the number of oxygen atoms is insufficient according to the stoichiometric composition. Examples of metal oxides in an oxygen-deficient state include SiOx, AlOx, TiOx, ZrOx, CeOx, MgOx, ZnOx, TaOx, SbOx, SnOx, MnOx, and the like. In addition, examples of metals include Si, Al, Ti, Zr, Ce, Mg, Zn, Ta, Sb, Sn, Mn, and the like. The adhesion layer 3 may be, for example, a layer in which x in SiOx is greater than 0 and less than 2.0.

From the viewpoint of maintaining transparency and obtaining good optical characteristics, the thickness of the adhesion layer 3 is preferably greater than 0 nm and 20 nm or less and particularly preferably 1 nm or more and 10 nm or less.

The optical function layer 4 is a layer which expresses an optical function. Optical functions are functions which control reflection, transmission, and refraction, which are the characteristics of light, and examples thereof include anti-reflection functions, selective reflection functions, anti-glare functions, lens functions, and the like. The optical function layer 4 is, for example, an anti-reflection layer, a selective reflection layer, and an anti-glare layer. As the anti-reflection layer, selective reflection layer, and anti-glare layer, it is possible to use known layers. The anti-reflection layer, the selective reflection layer, and the anti-glare layer may all be single layers or may be laminates of a plurality of layers.

The optical function layer 4 shown in FIG. 1 is an anti-reflection layer. The optical function layer 4 shown in FIG. 1 has a high refractive index layer 4a and a low refractive index layer 4b. The optical function layer 4 shown in FIG. 1 is a laminate of a total of four layers, in which the high refractive index layer 4a and the low refractive index layer 4b are alternately laminated in that order from the adhesion layer 3 side. The number of layers of the high refractive index layer 4a and the low refractive index layer 4b is not particularly limited and it is possible to set the number of layers of the high refractive index layer 4a and the low refractive index layer 4b to any number of layers.

The optical laminate 10 shown in FIG. 1 exhibits an anti-reflection function by interfering with reflected light reflected at each of the interfaces of the laminate in which the high refractive index layer 4a and the low refractive index layer 4b are alternately laminated and by diffusing light incident from the anti-fouling layer 5 side.

The low refractive index layer 4b includes, for example, an oxide of Si. For example, the low refractive index layer 4b is a layer in which the main component is $SiO_2$ (oxide of Si) or the like. Oxides of Si are easy to obtain and are advantageous in terms of cost. A $SiO_2$ monolayer film is colorless and transparent. In the present embodiment, the main component of the low refractive index layer 4b means that the component is included in the low refractive index layer 4b as 50% by mass or more.

In a case where the low refractive index layer 4b is a layer with an oxide of Si as the main component thereof, another element of less than 50% by mass may be included. The content of the element different from the oxide of Si is preferably 10% or less. The different elements are, for example, Na, Zr, Al, and N. Na increases the durability of the low refractive index layer 4b. Zr, Al, and N increase the hardness of the low refractive index layer 4b and increase the alkali resistance.

The refractive index of the low refractive index layer 4b is, for example, 1.20 or more and 1.60 or less and preferably 1.30 or more and 1.50 or less. The dielectric body used for the low refractive index layer 4b is, for example, magnesium fluoride ($MgF_2$, refractive index 1.38) or the like.

The refractive index of the high refractive index layer 4a is, for example, 2.00 or more and 2.60 or less and preferably 2.10 or more and 2.45 or less. The refractive index of the low refractive index layer 4b or the high refractive index layer 4a is measured by using the spectroscopic ellipsometry.

The dielectric body used for the high refractive index layer 4a is, for example, niobium pentoxide ($Nb_2O_5$, refractive index 2.33), titanium oxide ($TiO_2$, refractive index 2.33 to 2.55), tungsten oxide ($WO_3$, refractive index 2.2), cerium oxide ($CeO_2$, refractive index 2.2), tantalum pentoxide ($Ta_2O_5$, refractive index 2.16), zinc oxide (ZnO, refractive index 2.1), indium tin oxide (ITO, refractive index 2.06), zirconium oxide ($ZrO_2$, refractive index 2.2), or the like. In a case where it is desired to impart conductive characteristics to the high refractive index layer 4a, for example, it is possible to select ITO or indium oxide zinc oxide (IZO) as the dielectric body used for the high refractive index layer 4a.

In the optical function layer 4, for example, the high refractive index layer 4a formed of niobium pentoxide ($Nb_2O_5$, refractive index 2.33) is preferably used and the low refractive index layer 4b formed of $SiO_2$ is preferably used.

The film thickness of the low refractive index layer 4b may be in the range of 1 nm or more and 200 nm or less and is selected appropriately according to the wavelength range in which the anti-reflection function is necessary. The film thickness of the high refractive index layer 4a may be, for example, 1 nm or more and 200 nm or less and is selected appropriately according to the wavelength range in which the anti-reflection function is necessary. It is possible to appropriately select the film thicknesses of the high refractive index layer 4a and the low refractive index layer 4b, respectively, according to the design of the optical function layer 4. For example, in order from the adhesion layer 3 side, it is possible to set the high refractive index layer 4a of 5 to 50 nm, the low refractive index layer 4b of 10 to 80 nm, the high refractive index layer 4a of 20 to 200 nm, and the low refractive index layer 4b of 50 to 200 nm.

On the anti-fouling layer 5 side of the layers forming the optical function layer 4, for example, the low refractive index layer 4b, is arranged. In a case where the low refractive index layer 4b of the optical function layer 4 is in contact with the anti-fouling layer 5, the anti-reflection performance of the optical function layer 4 becomes good.

The anti-fouling layer 5 is over the outermost surface of the optical function layer 4. The anti-fouling layer 5 prevents contamination of the optical function layer 4. In addition, the anti-fouling layer 5 suppresses wear and tear of the optical function layer 4 by wear resistance and scratch resistance when applied to a touch panel or the like.

The anti-fouling layer 5 is, for example, a deposited film in which an anti-fouling material is deposited. The anti-fouling layer 5 is formed, for example, by vacuum deposition of a fluorine-based compound as an anti-fouling material on one surface of the low refractive index layer 4b forming the optical function layer 4. When the anti-fouling layer 5 includes the fluorine-based compound, the abrasion resistance and alkali resistance of the optical laminate 10 are further improved.

The fluorine-based compound included in the anti-fouling layer 5 is, for example, a fluorine-based organic compound. The fluorine-based organic compound is, for example, a compound formed of a fluorine-modified organic group and a reactive silyl group (for example, alkoxysilane). Commercially available products able to be used for the anti-fouling layer 5 include Optool DSX (manufactured by Daikin Industries, Ltd.) and the KY-100 series (manufactured by Shin-Etsu Chemical Co., Ltd.).

In a case where a compound formed of a fluorine-modified organic group and a reactive silyl group (for example, alkoxysilane) is used for the anti-fouling layer 5 and $SiO_2$ is used for the low refractive index layer 4b of the optical function layer 4, a siloxane bond is formed between the silanol group, which is the backbone of the fluorine-based organic compound, and the $SiO_2$. The siloxane bond increases the adhesion between the optical function layer 4 and the anti-fouling layer 5.

The optical thickness of the anti-fouling layer 5 is, for example, 1 nm or more and 20 nm or less and preferably 3 nm or more and 10 nm or less. When the thickness of the anti-fouling layer 5 is 1 nm or more, it is possible to sufficiently secure the wear resistance when the optical laminate 10 is applied to a touch panel application or the like. In addition, when the thickness of the anti-fouling layer 5 is 20 nm or less, the time required for deposition is short and efficient manufacturing is possible.

The anti-fouling layer 5 may include additives such as light stabilizers, UV absorbers, coloring agents, antistatic agents, lubricants, leveling agents, defoaming agents, antioxidants, flame retardants, infrared absorbers, surfactants, and the like, as necessary.

The anti-fouling layer 5 formed by deposition is firmly bonded to the optical function layer 4 and is dense with few voids. For this reason, the anti-fouling layer 5 formed by deposition exhibits different characteristics from anti-fouling layers formed by other methods, such as the coating of anti-fouling materials.

The optical laminate 10 having the anti-fouling layer 5 formed by deposition has the following characteristics.

(1) After a scratching test in which steel wool is moved horizontally back and forth 500 times, the difference in contact angle with respect to water is 100 or less.

(2) After the scratching test in which steel wool is moved horizontally back and forth 500 times, the contact angle with respect to water is 110° or more.

(3) After a scratching test in which a cloth (non-woven fabric wiper) is moved back and forth 4000 times, the contact angle with respect to water is 1000 or more.

(4) The amount of change (ΔE value) in L*a*b* values shown in formula (1) by SCI (Specular Component Included, a method of measuring reflective color that considers positive reflected light) before and after the scratching test in which steel wool is moved horizontally back and forth 500 times is 3.0 or less.

(5) The amount of change (ΔE value) in L*a*b* values shown in formula (1) by SCE (Specular Component Excluded, a method of measuring reflective color that does not consider positive reflected light) before and after the scratching test in which steel wool is moved horizontally back and forth 500 times is 1.5 or less.

(6) The fluorine residual ratio is 70% or more measured by X-ray fluorescence analysis (XRF) after immersion in a NaOH solution (liquid temperature: 55° C.) of 0.1 mol/L concentration for 4 hours.

$$\Delta E = \Delta(L*a*b*) = \sqrt{(L1*-L0*)+(a1*-a0*)^2+(b1*-b0*)^2}$$ [Formula 1]

In formula (1), L0*, a0*, and b0* are the values before the scratching test and L1*, a1*, and b1* are the values after the scratching test.

The anti-fouling layer 5 formed by deposition has fewer voids and is denser than an anti-fouling layer formed by coating. In addition, the anti-fouling layer 5 formed by deposition is more firmly joined to the low refractive index layer 4b than the anti-fouling layer 5 formed by coating.

The uppermost surface of the optical laminate 10 (the surface of the anti-fouling layer 5) is formed with irregularities. The irregularities of the uppermost surface of the optical laminate 10 are caused by the irregularities formed on the surface of the hard coat layer 2. Although the adhesion layer 3, the optical function layer 4, and the anti-fouling layer 5 are laminated over the hard coat layer 2, the thickness of each layer is not thick enough to fill in the irregularities of the surface of the hard coat layer 2. Accordingly, the uppermost surface of the optical laminate 10 is formed with irregularities which reflect the irregularities of the surface of the hard coat layer 2.

The 10-point average roughness Rz of the uppermost surface of the optical laminate 10 is 19 nm or more and 100 nm or less and preferably 40 nm or more and 100 nm or less. When the 10-point average roughness Rz at the uppermost surface of the optical laminate 10 is in the predetermined range, the anti-fouling layer 5 is less easily peeled off by contact such as wiping. When the anti-fouling layer 5 is not peeled off, the scratch resistance of the optical laminate 10 is improved.

The arithmetic average Ra of the optical laminate 10 is, for example, 1.9 nm or more and 13 nm or less and preferably 4 nm or more and 13 nm or less.

When the surface of the optical laminate 10 is measured by an atomic force microscope (AFM), it is possible to confirm irregularities caused by aggregates of the filler of the hard coat layer 2. The apparent average particle diameter of the aggregates of the filler, which is obtained by measuring the surface of the optical laminate 10 with an atomic force microscope, is, for example, 150 nm or more and 2200 nm or less and preferably 340 nm or more and 2200 nm or less. The apparent average particle diameter of the aggregates of the filler is the same as with the measurement method on the surface of the hard coat layer 2.

The value of the water contact angle after 2000 cycles of the steel wool sliding test on the surface of the optical laminate 10 is 84% or more of the value of the water contact angle before the steel wool sliding test and preferably 88% or more.

[Method for Manufacturing Optical Laminate]

As an example, a description will be given of a case where the optical laminate 10 is manufactured using the transparent base material 1 wound up into a roll form.

First, the transparent base material 1 wound up into a roll form is unwound. Then, a slurry including a material to be the hard coat layer 2 is coated over the transparent base material 1 by a known method and cured by a known method corresponding to the material to be the hard coat layer 2. Here, for example, an aggregating agent is added to the slurry including the material to be the hard coat layer 2. In addition, a material with poor compatibility with the resin portion of the hard coat layer 2 (for example, a compound having oxygen or nitrogen in the cyclic structure) may be mixed into the slurry including the material to be the hard coat layer 2. Predetermined irregularities are formed on the surface of the hard coat layer 2 after curing. Then, the transparent base material 1 with the hard coat layer 2 formed on the surface is wound up into a roll form by a known method.

Next, an adhesion layer formation step of forming the adhesion layer 3 and an optical function layer formation step of forming the optical function layer 4 are performed over the hard coat layer 2. Then, an anti-fouling layer formation step of forming the anti-fouling layer 5 over the optical function layer 4 is performed. Before the optical function layer formation step, a first surface treatment step of treating the surface of the hard coat layer 2 may be performed. In addition, after the optical function layer formation step, a second surface treatment step of treating the surface of the anti-reflection film may be performed.

In addition, the first surface treatment step and the adhesion layer formation step, as well as the optical function layer formation step, the second surface treatment step, and the anti-fouling layer formation step, are preferably performed continuously, maintaining the optical laminate in a reduced pressure state during the manufacturing.

Figure 2:
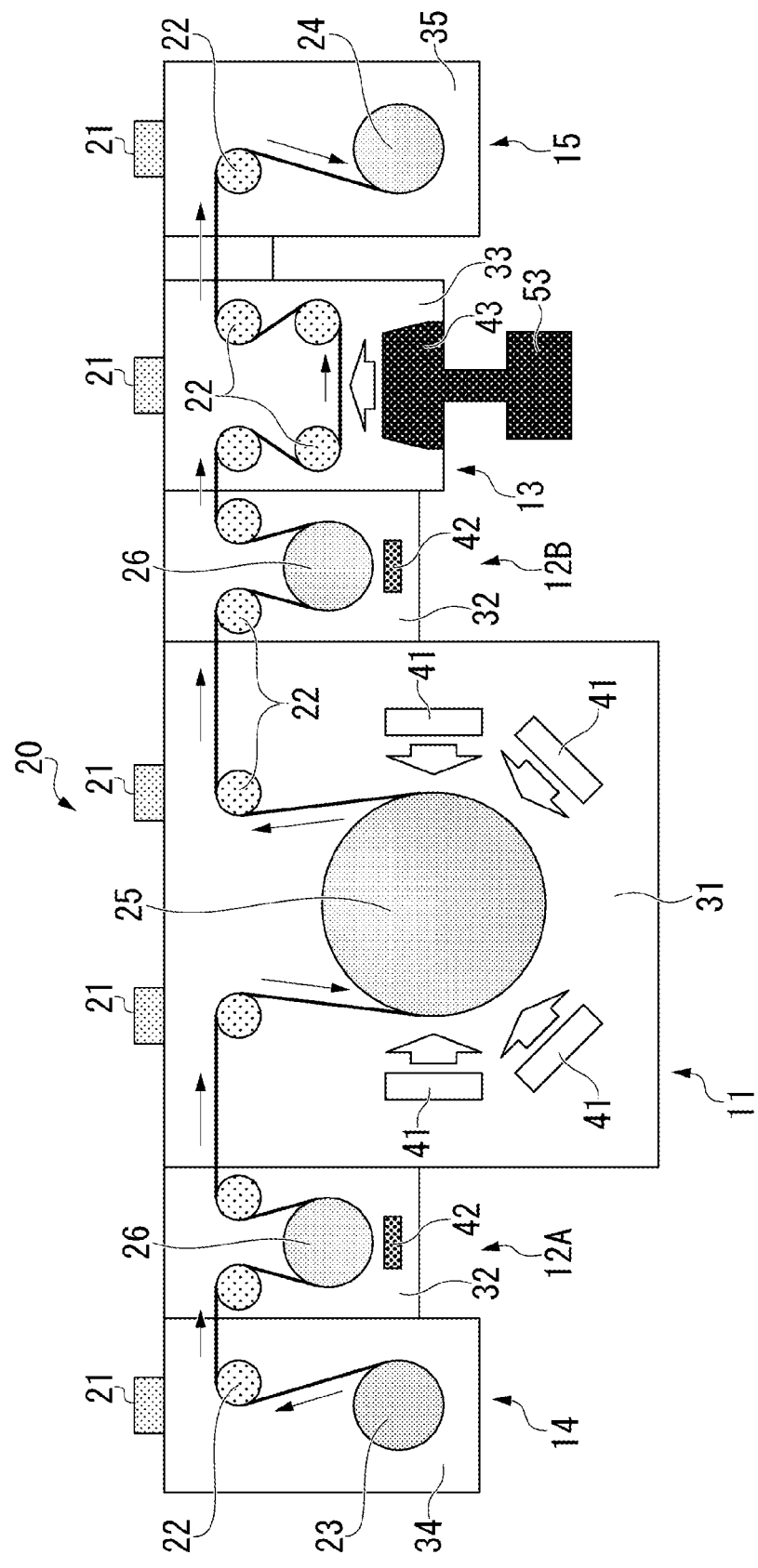
FIG. 2 is a schematic diagram of an example of a manufacturing apparatus for manufacturing the optical laminate according to the first embodiment.

FIG. 2 is an example of a manufacturing apparatus able to be used to manufacture the optical laminate 10 according to the first embodiment. A manufacturing apparatus 20 is provided with a roll unwinding apparatus 14, a pre-treatment apparatus 12A, a sputtering apparatus 11, a pre-treatment apparatus 12B, a deposition apparatus 13, and a roll winding apparatus 15, which are connected in that order. The manufacturing apparatus 20 unwinds the base material from the roll, passes the base material through these connected apparatuses in order, and then winds the base material, thereby producing the optical laminate 10 with a roll-to-roll method.

It is possible to appropriately set the transport speed (line speed) of the optical laminate 10 during the manufacturing. For example, the transport speed is preferably 0.5 to 20 m/min and more preferably 0.5 to 10 m/min.

The roll unwinding apparatus 14 has a chamber 34, a vacuum pump 21, an unwinding roll 23, and a guide roll 22. The inside of the chamber 34 is depressurized by the vacuum pump 21. The vacuum pump 21 is a known pump. The transparent base material 1 on which the hard coat layer 2 is formed is wound up on the unwinding roll 23. The unwinding roll 23 supplies the transparent base material 1 on which the hard coat layer 2 is formed to the pre-treatment apparatus 12A at a predetermined transport speed.

The pre-treatment apparatus 12A has a chamber 32, a can roll 26, the guide roll 22, and a plasma discharging apparatus 42. The can roll 26, the guide roll 22, and the plasma discharging apparatus 42 are installed inside the chamber 32. The chamber 32 is connected to chambers 31 and 34. The inside of the chamber 32 is depressurized.

The can roll 26 and the guide roll 22 transport the film sent from the roll unwinding apparatus 14 at a predetermined transport speed.

The plasma discharging apparatus 42 is arranged opposite the outer peripheral surface of the can roll 26 at a predetermined interval. The plasma discharging apparatus 42 ionizes a gas by glow discharge. The gas is, for example, argon gas, oxygen gas, nitrogen gas, helium gas, and the like. Argon gas is inexpensive, inert, and has no effect on optical characteristics and is thus preferable. The plasma discharging apparatus 42 is, for example, a glow discharge apparatus which ionizes argon gas by high-frequency plasma.

The plasma discharging apparatus 42 performs a first surface treatment step as a pre-treatment for the surface on which the adhesion layer 3 and the optical function layer 4 are formed. In the first surface treatment step, the can roll 26 and the guide roll 22 are rotated to treat the surface of the hard coat layer 2 at a predetermined transport speed. The plasma discharging apparatus 42 performs, for example, a glow discharge treatment, a plasma treatment, an ion etching, an alkaline treatment, and the like. The glow discharge treatment is able to carry out a large-area treatment. When the glow discharge treatment is performed, the surface of the hard coat layer 2 is roughened at the nano level and substances with weak bonding power existing on the surface of the hard coat layer 2 are removed. As a result, the adhesion between the hard coat layer 2 and the adhesion layer 3 formed over the hard coat layer 2 is improved.

After passing through the plasma discharging apparatus 42, the film is transported to the sputtering apparatus 11.

The sputtering apparatus 11 has the chamber 31, the vacuum pump 21, a film-forming roll 25, the guide roll 22, and a film-forming section 41. The film-forming roll 25, the guide roll 22, and the film-forming section 41 are installed inside the chamber 31. The chamber 31 is depressurized by the vacuum pump 21. Inside the chamber 31 of the sputtering apparatus 11, the adhesion layer formation step and the optical function layer formation step are performed.

The film-forming roll 25 and the guide roll 22 transport the film at a predetermined transport speed. The sputtering apparatus 11 laminates the adhesion layer 3, the high refractive index layer 4a, and the low refractive index layer 4b in order by sputtering over the hard coat layer 2 of the transparent base material 1 traveling on the film-forming roll 25. By alternately laminating the high refractive index layer 4a and the low refractive index layer 4b, the optical function layer 4 is formed.

A plurality of the film-forming sections 41 are arranged opposite the outer peripheral surface of the film-forming roll 25 at predetermined intervals so as to surround the film-forming roll 25. The number of the film-forming sections 41 is determined according to the total number of laminations of the adhesion layer 3 and the high refractive index layer 4a and the low refractive index layer 4b forming the optical function layer 4. A plurality of the film-forming rolls 25 or the chambers 31 may be provided to secure space for arranging the film-forming sections 41.

Each film-forming section 41 is, for example, a sputtering apparatus. Each film-forming section 41 has, for example, a target, a voltage application section for the target, a gas supply section which supplies a reaction gas or the like, and a magnetic field generation source which forms a magnetic field on the target surface. The target varies depending on the film to be formed. For example, in a case of forming a layer formed of $SiO_2$, Si is used as the target and $O_2$ is used as the reactive gas. In addition, for example, in a case of forming a layer formed of $Nb_2O_5$, Nb is used as the target and $O_2$ is used as the reactive gas. The film-forming method of the film-forming section 41 is, for example, a sputtering method and preferably a magnetron sputtering method. In addition, a two-pole sputtering method using plasma generated by DC glow discharge or at high frequency, or a three-pole sputtering method adding a hot cathode may also be used.

The sputtering apparatus 11 may have an optical monitor which measures the optical characteristics of each layer after film-forming. The optical monitor checks the quality of each layer. The optical monitor, for example, measures the optical characteristics of each layer in the width direction using an optical head able to carry out scanning in the width direction. The optical monitor, for example, is able to measure the optical thickness distribution of each layer in the width direction by measuring the peak wavelength of reflectance as an optical characteristic and converting the result to optical thickness. Measuring the optical characteristics using the optical monitor makes it possible to form the adhesion layer 3 and the optical function layer 4 having the optimum optical characteristics while adjusting the sputtering conditions in real time.

The film on which the adhesion layer 3 and the optical function layer 4 are formed is transported to the pre-treatment apparatus 12B.

The pre-treatment apparatus 12B has the chamber 32, the can roll 26, the guide roll 22, and the plasma discharging apparatus 42. The configuration of the pre-treatment apparatus 12B is the same as the pre-treatment apparatus 12A. Inside the chamber 32 of the pre-treatment apparatus 12B, a second surface treatment step is performed as a pre-treatment with respect to the surface on which the anti-fouling layer 5 is to be formed. The surface of the film after the second surface treatment step is performed may change in surface roughness. By changing the conditions of the second surface treatment step, the surface roughness of the surface on which the anti-fouling layer 5 is laminated may be adjusted. The film on which the pre-treatment is performed is transported to the deposition apparatus 13.

The deposition apparatus 13 has a chamber 33, the vacuum pump 21, the guide roll 22, a deposition source 43, and a heating apparatus 53. The inside of the chamber 33 is depressurized by the vacuum pump 21. The deposition apparatus 13 deposits the anti-fouling layer 5 onto the transported film.

The deposition source 43 is in a position opposite the film being transported approximately horizontally between two adjacent guide rolls 22. The deposition source 43 supplies an evaporating gas formed of the material to be the anti-fouling layer 5 over the optical function layer 4. It is possible to set the deposition source 43 to any orientation.

The heating apparatus 53 heats the material to be the anti-fouling layer 5 to a vapor pressure temperature. The heating apparatus 53, for example, heats by a resistance heating method, a heater heating method, an induction heating method, or an electron beam method.

The deposition apparatus 13 is provided with, for example, a guide plate, a film thickness gauge, a vacuum pressure gauge, and a power source apparatus. The guide plate guides the evaporated deposition material to a desired position. The film thickness gauge measures the film thickness of the deposited film. The vacuum pressure gauge measures the degree of vacuum inside the chamber 33. The vacuum pressure gauge is, for example, an ion gauge or the like. The power source apparatus is, for example, a high-frequency power source or the like.

The film on which the anti-fouling layer 5 was formed in the deposition apparatus 13 is transported to the roll winding apparatus 15. From the optical function layer formation step to the anti-fouling layer formation step, the process is preferably performed continuously in an in-line manner while maintaining a reduced pressure state. It is possible to avoid the formation of natural oxide films and contamination by foreign substances and the like.

The roll winding apparatus 15 has a chamber 35, the vacuum pump 21, a winding roll 24, and the guide roll 22. The inside of the chamber 35 is depressurized by the vacuum pump 21. The winding roll 24 winds the optical laminate 10 formed up to the anti-fouling layer 5. The winding roll 24 and the guide roll 22 wind the optical laminate 10 at a predetermined winding speed. As necessary, a carrier film may also be used. By following the above procedure, it is possible to produce the optical laminate 10.

The optical laminate 10 of the first embodiment has a predetermined shape on the surface thereof which makes it difficult for the anti-fouling layer 5 to peel off even in a case where there is contact such as wiping. The anti-fouling layer 5 not being easily peeled off from the optical laminate 10 makes it difficult for the scratch resistance of the optical laminate 10 to deteriorate. That is, it is possible for the optical laminate 10 to maintain scratch resistance for a long time.

The present invention is not limited to the embodiments described above and various variations and changes are possible within the range of the gist of the present invention as described in the claims.

For example, the optical laminate 10 may have layers other than the transparent base material 1, the hard coat layer 2, the adhesion layer 3, the optical function layer 4, and the anti-fouling layer 5. The optical laminate 10 may also have various layers on the surface of the transparent base material 1 opposite to the surface on which the optical function layer 4 or the like is formed, as necessary. For example, an adhesive layer used for bonding with other members may be provided. In addition, other optical films may be provided through this adhesive layer. Examples of other optical films include polarizing films, phase difference compensation films, films which function as ½ wavelength plates and ¼ wavelength plates, and the like.

In addition, layers having functions such as anti-reflection, selective reflection, anti-glare, polarization, phase difference compensation, viewing angle compensation or expansion, light guiding, diffusion, brightness enhancement, hue adjustment, and conductivity may be formed directly on the opposing surface of the transparent base material 1. On the surface of the optical laminate 10, nano-order irregular structures expressing moth-eye and anti-glare functions may be formed. Micro to millimeter order geometric shapes such as lenses and prisms may be formed on the surface of the optical laminate 10.

In addition, it is possible to apply the optical laminate 10 to a variety of articles. For example, the optical laminate 10 may be provided on the screen of an image display unit, such as a liquid crystal display panel or an organic EL display panel. Due to this, for example, touch panel display sections of smartphones and operation devices exhibit high scratch resistance and it is possible to obtain an image display apparatus suitable for actual use.

In addition, the articles are not limited to image display apparatuses and it is possible to apply the optical laminate 10 to window glass, goggles, light-receiving surfaces of solar cells, screens of smartphones and displays of personal computers, information input terminals, tablet terminals, augmented reality (AR) devices, virtual reality (VR) devices, electric light display boards, glass table surfaces, amusement machines, operation support devices such as aircraft and trains, navigation systems, instrument panels, surfaces of optical sensors, and the like.

EXAMPLES

Example 1

First, a light-curable resin composition was prepared in which a content of silica particles (filler) with an average particle diameter of 50 nm was 28% by mass with respect to the entire solid content of the resin composition (binder resin). The resin composition was prepared by dissolving silica particles, acrylate, a leveling agent, and a photopolymerization initiator in a solvent as shown in Table 1, and finally adding an aggregating agent thereto.

TABLE 1

| | Product name | Maker | Composition | Blending ratio |
|---|---|---|---|---|
| Acrylate | CN968 | Sartomer | Urethane acrylate oligomer | 8% |
| | SR444 | Sartomer | Pentaerythritol triacrylate | 7% |
| | SR610 | Sartomer | Polyethylene glycol (600) diacrylate | 11% |
| Silica particles | IPA-ST-L | Nissan Chemical Corporation | Silica sol with particle diameter of 40 to 50 nm (solid content 30%, IPA solvent) | 37% |
| Initiator | Irgacure 184 | BASF | Initiator | 2% |
| Solvent | PGMA | | Propyleneglycol monomethyl ether acetate | 30% |
| | Butyl acetate | | | 5% |
| Total | | | | 100% |
| Leveling agent | BYK377 | BYK | Polyether-modified polydimethyl siloxane | 0.01 parts by weight per total 100 parts by weight |

A TAC film in roll form having a thickness of 80 μm and a length of 3900 m was prepared as the transparent base material 1 and the light-curable resin composition described above was coated over the TAC film by a gravure coater. Then, the resin composition was cured by being irradiated with light to form the hard coat layer 2 with a thickness of 10 μm.

The surface roughness (arithmetic surface roughness Ra, 10-point average roughness Rz) of the produced hard coat layer 2 and the apparent average particle diameter of the filler aggregates were determined. The surface roughness and the apparent average particle diameter of the filler aggregates were measured by an AFM.

Next, using a roll-to-roll method, the adhesion layer 3, the optical function layer 4, and the anti-fouling layer 5 were continuously manufactured in this order on the transparent base material 1 on which the hard coat layer 2 was formed, using the method shown below, to produce the optical laminate (anti-reflection film) of Example 1.

As a manufacturing apparatus, the manufacturing apparatus 20 shown in FIG. 2 was used. The line speed was set at 2 m/min. The first surface treatment step, the adhesion layer formation step, the optical function layer formation step, the second surface treatment step, and the anti-fouling layer formation step were performed continuously while maintaining the optical laminate in a reduced pressure state during the manufacturing.

A glow discharge treatment was performed on the hard coat layer 2 with the treatment intensity of the glow discharge treatment set at 4000 W-min/m². Then, the adhesion layer 3 formed of SiOx with a thickness of 5 nm was formed in a film over the hard coat layer 2 after the glow discharge treatment by sputtering inside a chamber with a pressure of 1.0 Pa or less and the optical function layer 4 (laminate) formed of an $Nb_2O_5$ film with a thickness of 15 nm (high refractive index layer), an $SiO_2$ film with a thickness of 38 nm (low refractive index layer), an $Nb_2O_5$ film with a thickness of 30 nm (high refractive index layer), and an $SiO_2$ film with a thickness of 102 nm (low refractive index layer) was formed in a film over the adhesion layer.

Then, a glow discharge treatment was performed on the surface of the optical function layer 4. The integrated output of the glow discharge treatment was 326 W min/m².

Next, over the optical function layer 4, the anti-fouling layer 5 formed of an alkoxysilane compound (KY-1901, manufactured by Shin-Etsu Chemical Co., Ltd.) having a perfluoropolyether group which is an organic compound having fluorine was formed by deposition at a deposition chamber pressure of 0.01 Pa or less, a deposition temperature of 230° C., and a line speed of 2.0 m/min. Thereafter, the result was wound in roll form to obtain the optical laminate (anti-reflection film) of Example 1.

The surface roughness (arithmetic surface roughness Ra, 10-point average roughness Rz) and apparent average particle diameter of filler aggregates of the produced optical laminate were determined. The surface roughness and the apparent average particle diameter of the filler aggregates were measured by an AFM.

The optical characteristics of the optical laminates were also measured. As the optical characteristics, diffuse reflected light (SCE), haze, and transmittance (TT) were measured. The optical characteristics were measured using an NDH-5000SP optical spectrometer manufactured by Nippon Denshoku Industries Co., Ltd. An adhesion test was also performed on the optical function layer in the optical laminate. The adhesion was evaluated by the cross-cut adhesion test method in accordance with JIS K5400.

In addition, a scratch resistance test was also performed on the optical laminates. For the scratch resistance test, a steel wool test and a pen sliding test were performed.

The steel wool test was performed using a Type I friction testing machine in accordance with JIS L0849. Steel wool (#0000, manufactured by Bonstar Corporation) was used as a friction body and the friction body was moved horizontally back and forth along the surface of the optical laminate. The test settings were a 1000 g/cm² load, 75 mm strokes, and a 7 mm/s speed. Preparation was carried out for moving horizontally back and forth 2000, 3000, and 4000 times respectively. Then, the contact angle of the sample after the steel wool test was measured.

The contact angle was measured by the ellipse fitting method using a fully automatic contact angle meter DM-700 (manufactured by Kyowa Interface Science Co., Ltd.) under the following conditions. Distilled water was placed in a glass syringe, a stainless-steel needle was attached to the tip thereof, and pure water was added dropwise onto the optical laminate (test piece).

Dropwise volume of pure water: 2.0 μL
Measurement temperature: 25° C.

The contact angle after 4 seconds of the dropwise addition of pure water was measured at any six locations on the surface of the test piece and the average value thereof was used as the pure water contact angle (WCA).

In addition, visual inspection of the samples after the steel wool test was performed and the presence or absence of visible scratches was confirmed. The visual evaluation was "A" when it was not possible to confirm scratches and "B" when scratches were confirmed.

The pen sliding test was performed under a load of 200 g at a sliding speed of 60 rpm. The sliding distance was set at 5 cm and sliding was carried out 50,000 times in a straight line at the same location. The pen sliding test evaluation was "A" when no scratches were confirmed when the sliding part was visually confirmed and "B" when scratches were confirmed when the sliding part was visually confirmed.

Example 2 to Example 5

Example 2 to Example 5 differ from Example 1 in that the film thickness of the hard coat layer 2 and the addition amount of aggregating agent added to the resin composition for forming the hard coat layer 2 were changed. In Example 2, the film thickness of the hard coat layer 2 was set to 10 μm. In Example 3, the film thickness of the hard coat layer 2 was set to 3 μm. In Example 4, the film thickness of the hard coat layer 2 was set to 25 μm. In Example 5, the film thickness of the hard coat layer 2 was set to 5 μm.

For Examples 2 to 5, the same evaluation as in Example 1 was performed and tests were performed on the surface state of the hard coat layer 2, the surface state of the optical laminate, the optical characteristics of the optical laminate, and the scratch resistance of the optical laminate.

Comparative Example 1 to Comparative Example 5

Comparative Example 1 to Comparative Example 5 differ from Example 1 in that the film thickness of the hard coat layer 2 and the addition amount of aggregating agent added to the resin composition for forming the hard coat layer 2 were changed. In Comparative Example 1, the film thickness of the hard coat layer 2 was set to 3 μm. In Comparative Examples 2 and 3, the film thickness of the hard coat layer 2 was set to 10 μm. In Comparative Example 4, the film thickness of the hard coat layer 2 was set to 1 μm. In Comparative Example 5, the film thickness of the hard coat layer 2 was set to 30 μm.

For Comparative Example 1 to Comparative Example 4, the same evaluation as in Example 1 was performed and tests were performed on the surface state of the hard coat layer 2, the surface state of the optical laminate, the optical characteristics of the optical laminate, and the scratch resistance of the optical laminate. In Comparative Example 5, cracks were generated on the entire surface of the sample after curing the hard coat layer 2 and the cracks progressed further in the subsequent film-forming treatment. Accordingly, the scratch resistance test was not performed for Comparative Example 5. In addition, for Comparative Example 5, an accurate evaluation of the adhesion was not possible. For the optical laminates of Comparative Example 1 to Comparative Example 5, the cycle test by the steel wool test was terminated when scratches were visually confirmed on the surface after the steel wool test.

The following table summarizes the results of Examples 1 to 5 and Comparative Examples 1 to 5. In Table 2, HC is the hard coat layer and WCA is the contact angle.

TABLE 21

|  |  |  | Example 1 | Example 2 | Example 3 | Example 4 | Example 5 |
|---|---|---|---|---|---|---|---|
| HC thickness |  |  | 10 μm | 10 μm | 3 μm | 25 μm | 5 μm |
| Optical laminate | Ra (n5 ave.) |  | 12.9 | 4.9 | 7.7 | 3.5 | 1.9 |
|  | N-point average surface roughness Rz [nm] |  | 98.4 | 46.3 | 51.9 | 29.0 | 19.5 |
|  | Average particle diameter (nm) |  | 2183.8 | 348.7 | 850.2 | 169.0 | 158.2 |
| HC | Ra (n5 ave.) |  | 11.8 | 3.6 | 6.6 | 3 | 1.7 |
|  | Average surface roughness Rz [nm] |  | 108.0 | 51.4 | 56.2 | 31.42 | 21.2 |
|  | Average particle diameter (nm) |  | 1528.7 | 244.1 | 595.1 | 118.3 | 110.7 |
| SW test | Initial |  | 116.7 | 118.1 | 117.7 | 117.5 | 117.3 |
|  | 2000 cyc | WCA after sliding test | 111.8 | 108.2 | 104.3 | 101.2 | 101.1 |
|  |  | WCA change ratio | 95.8% | 91.6% | 88.6% | 86.1% | 86.2% |
|  |  | Scratches | A | A | A | A | A |
|  | 3000 cyc | WCA after sliding test | 107.8 | 108.8 | 104 | 98 | 95.7 |
|  |  | WCA change ratio | 92.4% | 92.1% | 88.4% | 83.4% | 81.6% |
|  |  | Scratches | A | A | A | A | A |
|  | 4000 cyc | WCA after sliding test | 106 | 106 | — | — | — |
|  |  | WCA change ratio | 91.2% | 89.8% | — | — | — |
|  |  | Scratches | A | A | — | — | — |
| Pen sliding test |  |  | A | A | A | A | A |
| Diffusion reflection SCE | HC |  | 0.34 | 0.07 | 0.08 | 0.04 | 0.04 |
|  | Optical laminate |  | 0.46 | 0.1 | 0.13 | 0.06 | 0.06 |
| Haze |  |  | 1.3 | 0.5 | 0.5 | 0.3 | 0.3 |
| Transmittance |  |  | 91.79 | 93.13 | 92.99 | 93.14 | 93.14 |
| Adhesion |  |  | good | good | good | good | good |

TABLE 21-continued

|  |  | Comparative Example 1 | Comparative Example 2 | Comparative Example 3 | Comparative Example 4 | Comparative Example 5 |
|---|---|---|---|---|---|---|
| HC thickness |  | 3 μm | 10 μm | 10 μm | 1 μm | 30 μm |
| Optical laminate | Ra (n5 ave.) | 2.0 | 0.3 | 22 | 2.8 | 4.0 |
|  | N-point average surface roughness Rz [nm] | 18.3 | 4.5 | 120.8 | 21.2 | 33.5 |
|  | Average particle diameter (nm) | 183.1 | 311.8 | 4774 | 285.9 | 171.9 |
| HC | Ra (n5 ave.) | 1.7 | 0.30 | 18.7 | 2.4 | 3.4 |
|  | Average surface roughness Rz [nm] | 19.9 | 4.9 | 134.5 | 23.0 | 36.34 |
|  | Average particle diameter (nm) | 128.2 | 218.2 | 2618.0 | 200.1 | 120.3 |
| SW test | Initial | 117.5 | 118 | 118.3 | 117.1 | — |
|  | 2000 cyc WCA after sliding test | 98 | 97.8 | 72 | 60.1 | — |
|  | WCA change ratio | 83.4% | 82.9% | 60.9% | 51.3% | — |
|  | Scratches | A | A | B | B | — |
|  | 3000 cyc WCA after sliding test | 90 | 89 | 65 | — | — |
|  | WCA change ratio | 76.6% | 75.4% | 54.9% | — | — |
|  | Scratches | A | A | B | — | — |
|  | 4000 cyc WCA after sliding test | — | — | — | — | — |
|  | WCA change ratio | — | — | — | — | — |
|  | Scratches | — | — | — | — | — |
| Pen sliding test |  | B | B | B | B | — |
| Diffusion reflection SCE | HC | 0.03 | 0.02 | 1.51 | 0.03 | 0.04 |
|  | Optical laminate | 0.06 | 0.03 | 0.81 | 0.05 | 0.07 |
| Haze |  | 0.3 | 0.2 | 8 | 0.3 | 0.3 |
| Transmittance |  | 92.98 | 93.5 | 89.19 | 93.22 | 93.2 |
| Adhesion |  | good | good | good | good | — |

EXPLANATION OF REFERENCES

1 . . . Transparent base material
2 . . . Hard coat layer
3 . . . Adhesion layer
4 . . . Optical function layer
4a . . . High refractive index layer
4b . . . Low refractive index layer
5 . . . Anti-fouling layer
10 . . . Optical laminate

What is claimed is:

1. An optical laminate comprising:
a transparent base material;
a hard coat layer;
an optical function layer; and
an anti-fouling layer, which are laminated in that order, wherein the hard coat layer contains a filler, wherein the hard coat layer has a thickness of 3 μm or more and 25 μm or less, wherein a 10-point average roughness Rz of a surface of the optical laminate is 19 nm or more and 100 nm or less, and wherein an apparent average particle diameter of an aggregate of the filler, which is obtained by measuring the surface of the optical laminate with an atomic force microscope, is 150 nm or more and 2200 nm or less.

2. The optical laminate according to claim 1, wherein an apparent average particle diameter of an aggregate of the filler, which is obtained by measuring a surface of the hard coat layer with an atomic force microscope, is 110 nm or more and 1600 nm or less.

3. The optical laminate according to claim 1, wherein the optical function layer includes at least a low refractive index layer.

4. The optical laminate according to claim 1, wherein a low refractive index layer and a high refractive index layer are alternately laminated in the optical function layer.

5. The optical laminate according to claim 1, wherein a value of a water contact angle after 2000 cycles of a steel wool sliding test is 84% or more of a value of a water contact angle before the steel wool sliding test.

6. The optical laminate according to claim 1, wherein the anti-fouling layer includes a fluorine-based compound.

7. An article comprising:
the optical laminate according to claim 1.

8. An image display apparatus comprising:
a screen; and
the optical laminate according to claim 1, which is formed on a surface of the screen.

9. An optical laminate comprising:
a transparent base material;
a hard coat layer;
an optical function layer, and
an anti-fouling layer, which are laminated in that order, wherein the hard coat layer contains a filler, wherein the hard coat layer has a thickness of 3 μm or more and 25 μm or less, wherein a 10-point average roughness Rz of a surface of the optical laminate is 19 nm or more and 100 nm or less, and wherein an apparent average particle diameter of an aggregate of the filler, which is obtained by measuring a surface of the hard coat layer with an atomic force microscope, is 110 nm or more and 1600 nm or less.

10. An optical laminate comprising:
a transparent base material;
a hard coat layer;
an optical function layer, and
an anti-fouling layer, which are laminated in that order, wherein the hard coat layer contains a filler, wherein the hard coat layer has a thickness of 3 μm or more and 25 μm or less, wherein a 10-point average roughness Rz of a surface of the optical laminate is 19 nm or more and 100 nm or less, and wherein a value of a water contact angle after 2000 cycles of a steel wool sliding test is 84% or more of a value of a water contact angle before the steel wool sliding test.

* * * * *